Dec. 1, 1953   W. R. ALLRED ET AL   2,661,015
HOT BEVERAGE UNIT FOR MOTOR VEHICLES
Filed May 8, 1950   2 Sheets-Sheet 1

Inventors
William R. Allred
John C. Allred
Albert R. Allred

Dec. 1, 1953 — W. R. ALLRED ET AL — 2,661,015
HOT BEVERAGE UNIT FOR MOTOR VEHICLES
Filed May 8, 1950 — 2 Sheets-Sheet 2

Inventors
William R. Allred
John C. Allred
Albert R. Allred

ATTORNEYS

Patented Dec. 1, 1953

2,661,015

UNITED STATES PATENT OFFICE 2,661,015

HOT BEVERAGE UNIT FOR MOTOR VEHICLES

William R. Allred, John C. Allred, and Albert R. Allred, Madera, Calif.

Application May 8, 1950, Serial No. 160,644

1 Claim. (Cl. 137—353)

This invention is directed to, and it is an object to provide, a novel unit adapted to be mounted on a motor vehicle and conveniently useful for making a hot beverage; the unit being especially useful on automobiles, trucks, tractors. or the like.

Another object of the invention is to provide a hot beverage unit, as above, which includes an ever-ready supply of hot water for the preparation of the beverage; such supply being maintained at relatively high temperature by a novel heating device connected to the water system of the motor vehicle.

A further object of the invention is to provide the unit in compact form which can be readily mounted on a motor vehicle as an accessory; the unit including a hot water tank, and a case in adjacent but spaced relation and adapted to be secured on opposite sides of the fire-wall of the vehicle, the tank being in the engine compartment and the case in the operator's compartment of the vehicle.

An additional object of the invention is to provide a hot beverage unit, as in the preceding paragraph, including a hot water spigot in the case and fed from the tank; there being a novel assembly in the case to supply the user with cups, spoons, and necessary ingredients for the beverage.

A further object of the invention is to provide a hot beverage unit which is designed for ease and economy of manufacture, and simple installation; the unit being sturdy, yet neat in appearance.

Still another object of the invention is to provide a hot beverage unit which is practical and reliable, and yet exceedingly effective for the purpose for which it is designed.

These objects are accomplished by means of such structure and relative arrangement of parts as will fully appear by a perusal of the following specification and claim.

In the drawings:

Fig. 3 is a fragmentary sectional elevation on line 3—3 of Fig. 2.

Figure 1:
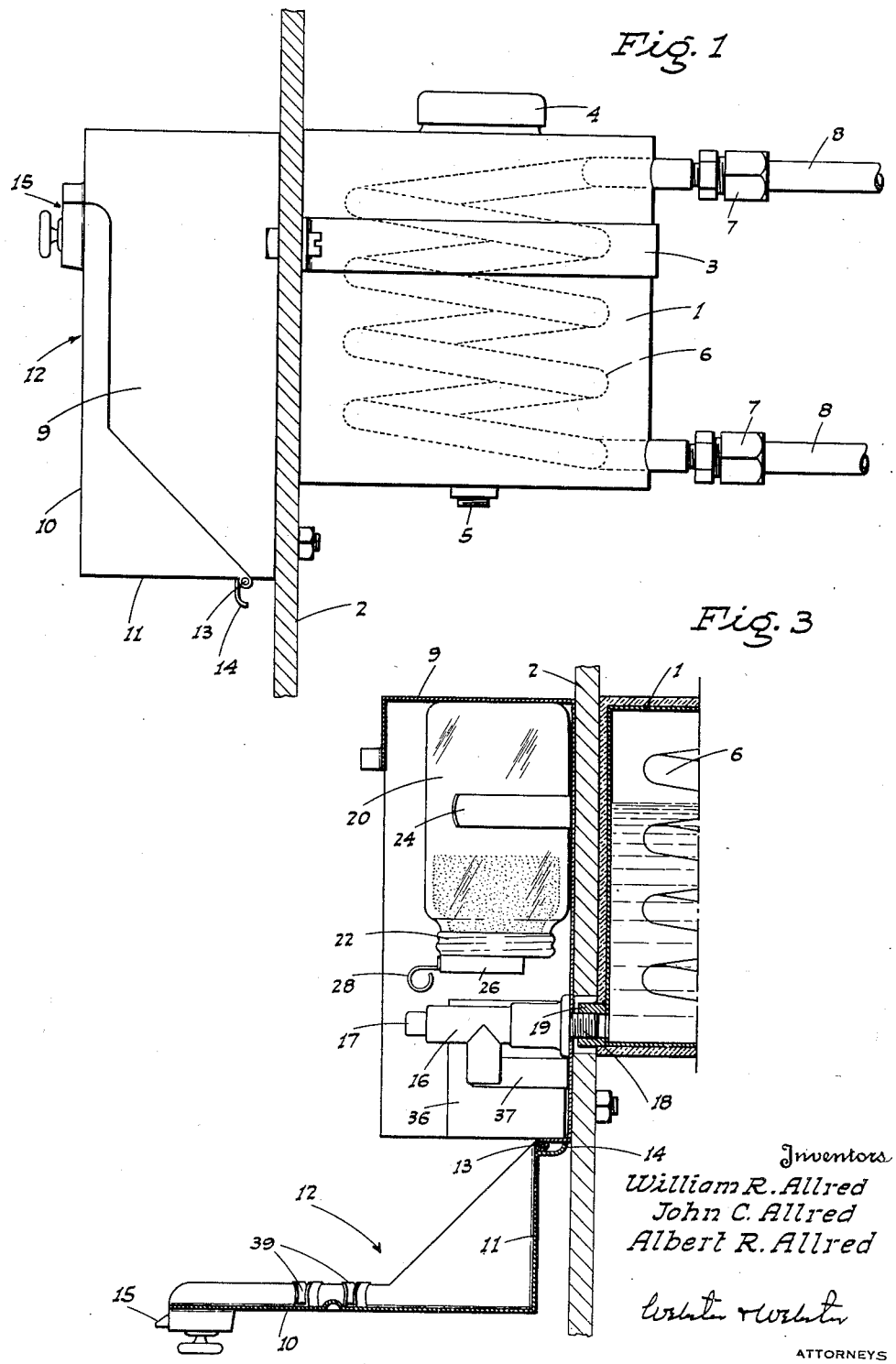
Fig. 1 is a side elevation of the unit as mounted in place; the door of the case being in its normal closed position.
Figure 2:
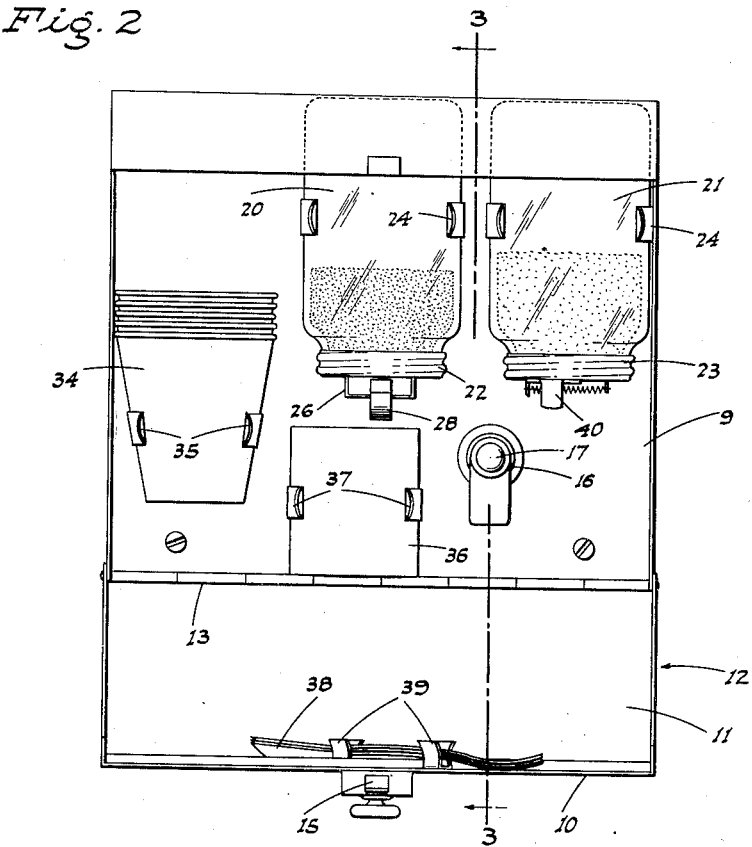
Fig. 2 is a front elevation of the case with the door open.

Referring now more particularly to the characters of reference on the drawings, the beverage unit comprises a hot-water tank 1 disposed in the engine compartment of the vehicle and secured to the partition or fire-wall 2 by means of a retention strap 3. The hot-water tank 1 includes a filler cap 4 at the top, and a drain plug 5 at the bottom.

A water heating coil 6 is disposed in the tank 1, and—at opposite ends—is connected, exteriorly of said tank, by fittings 7 with pipes 8 which are connected into the hot-water system (not otherwise shown) of the vehicle.

With circulation of engine heated water through the coil 6, fresh water in the tank 1 is heated, and thus provides an ever-ready supply.

On the opposite side of the partition or fire-wall 2, i. e. in the operator's compartment of the vehicle, there is an upstanding, rectangular case or cabinet 9, preferably of metal, secured to said fire-wall in adjacent relation to the tank 1.

The case 9 includes a front panel 10, and a bottom 11, in rigid right angular relationship to form a normally closed door, indicated generally at 12; the inner edge of the bottom 11 being hinged, as at 13, for opening of the door 12 from its normally closed position, as in Fig. 1, to a down position, as in Fig. 3.

When in its open position the door 12 is held by a stop 14 in a substantially horizontal position, whereby to provide a service shelf.

The door 12 is held in its normally closed position by a catch 15.

A spigot 16, including a thumb-operated push button 17, is disposed in the case 9, and said spigot is connected in communication with the hot-water tank 1 by a fitting 18 and boss 19, the assembly of which extends through the fire-wall 2.

In addition to the spigot 16 the case 9 encloses a pair of containers 20 and 21, preferably in the form of inverted jars having screw-on dispenser caps 22 and 23 on their lower ends. The jars 20 and 21 are secured, in an upper portion of the case, by means of spring clips 24.

Figure 4:
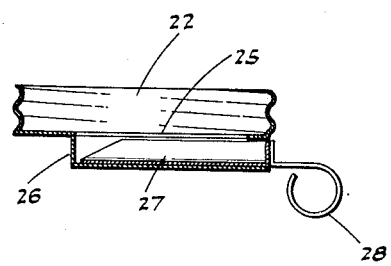
Fig. 4 is a sectional elevation of the dispenser cap for the beverage material container.
Figure 5:
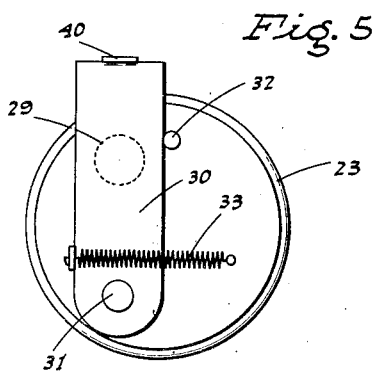
Fig. 5 is a bottom plan view of the dispenser cap for the sugar container.

The jar 20 is adapted to hold a supply of beverage material, such as instant coffee, chocolate, or the like, which material is dispensed by the cap 22; the latter being shown in detail in Fig. 4.

The cap 22 includes an opening 25 which registers with a depending housing 26 opening forwardly, and into which housing a pull-out measuring scoop 27 engages. The measuring scoop 27 includes a forwardly projecting finger-grip 28 whereby the scoop 27 may be withdrawn with a measured quantity of the beverage material therein.

The jar 21 is adapted to hold a quantity of sugar, and the dispensing cap 23 is formed with an aperture 29 normally closed by a flat swing valve 30 pivoted, as at 31, and held closed against a stop 32 by a spring 33.

A stack of heat resistant paper or fiber cups 34 are held in the case by spring clips 35, while a can 36 of condensed milk is likewise held in the case by spring clips 37. A supply of fiber spoons 38 are secured to the inner face of the front panel 10 by spring clips 39.

In use of the above described unit the door 12 is first opened and then a paper cup 34 is withdrawn from the stack and filled with hot water from the spigot 16. Thereafter a quantity of the beverage material is withdrawn from the jar 20 by means of the measuring scoop 27, and such material is poured into the hot water in the cup. Similarly, a quantity of sugar is placed in the cup from the jar 21 by manipulating the swing valve 30; the latter including a finger tab 40.

If condensed milk is desired in the beverage the can 36 is removed from the spring clips 37 for the purpose.

In order to stir the beverage in the cup one of the fiber spoons 38 is detached from the spring clips 39.

With the described unit a hot beverage can be prepared quickly and conveniently by a person seated in the driver's compartment of the vehicle, either when the vehicle is in operation or otherwise.

When the unit is not in use the door 12 is closed and the interior of the case is thus maintained clean and sanitary.

The unit is neat in appearance both in use and when not in use, and by reason of its construction the unit can be mounted as an accessory on a vehicle, and without difficulty.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

In a motor vehicle having a fire wall separating the engine and driver's compartment of the vehicle, the combination of a hot water tank supported against the engine side of the fire wall, a cabinet for drink making supplies secured against the driver's side of the fire wall directly opposite the tank, and a spigot projecting from the tank through the fire wall and into the cabinet.

WILLIAM R. ALLRED.
JOHN C. ALLRED.
ALBERT R. ALLRED.

References Cited in the file of this patent

UNITED STATES PATENTS

| Number | Name | Date |
|---|---|---|
| 372,267 | Johnson | Oct. 25, 1887 |
| 1,088,455 | Rosser | Feb. 24, 1914 |
| 1,109,734 | Bauer | Sept. 8, 1914 |
| 1,228,932 | Laun | June 5, 1917 |
| 1,526,095 | Siegel | Feb. 10, 1925 |
| 1,551,826 | Harvey | Sept. 1, 1925 |
| 1,757,448 | Cooper | May 6, 1930 |
| 1,933,517 | Tucker | Oct. 31, 1933 |
| 2,408,704 | Taylor | Oct. 1, 1946 |
| 2,411,196 | Dolan | Nov. 19, 1946 |
| 2,533,881 | Duff | Dec. 12, 1950 |